(12) United States Patent
Kudo et al.

(10) Patent No.: US 10,208,385 B2
(45) Date of Patent: Feb. 19, 2019

(54) CARBON DIOXIDE ELECTROLYTIC DEVICE AND CARBON DIOXIDE ELECTROLYTIC METHOD

(71) Applicant: KABUSHIKI KAISHA TOSHIBA, Minato-ku (JP)

(72) Inventors: Yuki Kudo, Yokohama (JP); Akihiko Ono, Kita (JP); Ryota Kitagawa, Setagaya (JP); Masakazu Yamagiwa, Yokohama (JP); Eishi Tsutsumi, Kawasaki (JP); Yoshitsune Sugano, Kawasaki (JP); Jun Tamura, Chuo (JP); Satoshi Mikoshiba, Yamato (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/703,364

(22) Filed: Sep. 13, 2017

(65) Prior Publication Data

US 2018/0274109 A1    Sep. 27, 2018

(30) Foreign Application Priority Data

Mar. 21, 2017  (JP) ................................. 2017-054570

(51) Int. Cl.
  *C25B 1/04*   (2006.01)
  *C25B 15/02*  (2006.01)
  (Continued)

(52) U.S. Cl.
  CPC .................. *C25B 1/04* (2013.01); *C25B 1/10* (2013.01); *C25B 3/04* (2013.01); *C25B 9/04* (2013.01);
  (Continued)

(58) Field of Classification Search
  CPC .. C25B 1/04; C25B 15/08; C25B 9/04; C25B 9/08; C25B 3/04; C25B 1/10; C25B 15/02
  See application file for complete search history.

(56) References Cited

U.S. PATENT DOCUMENTS

| 4,185,142 A | 1/1980 | Solomon et al. |
| 7,507,323 B1 | 3/2009 | Eyal |

(Continued)

FOREIGN PATENT DOCUMENTS

| JP | 55-24991 | 2/1980 |
| JP | 2003-147565 | 5/2003 |

(Continued)

OTHER PUBLICATIONS

Extended European Search Report issued Feb. 20, 2018 in European Patent Application No. 17191058.1, 7 pages.

(Continued)

*Primary Examiner* — Arun S Phasge
(74) *Attorney, Agent, or Firm* — Oblon, McClelland, Maier & Neustadt, L.L.P.

(57) ABSTRACT

A carbon dioxide electrolytic device of an embodiment includes: an electrolysis cell including a cathode, an anode, a carbon dioxide supply unit, an electrolytic solution supply unit, and a separator; a power supply; a reaction control unit which causes a reduction reaction and an oxidation reaction by passing an electric current from the power supply to the anode and the cathode; a refresh material supply unit including a gas supply unit which supplies a gaseous substance to at least one of the anode and the cathode; and a refresh control unit which stops supply of the current from the power supply and supply of carbon dioxide and an electrolytic solution, and operates the refresh material supply unit, based on request criteria of a cell output of the electrolysis cell.

13 Claims, 12 Drawing Sheets

(51) Int. Cl.
*C25B 1/10* (2006.01)
*C25B 3/04* (2006.01)
*C25B 9/08* (2006.01)
*C25B 9/04* (2006.01)
*C25B 15/08* (2006.01)

(52) U.S. Cl.
CPC ............ *C25B 9/08* (2013.01); *C25B 15/02* (2013.01); *C25B 15/08* (2013.01)

(56) References Cited

U.S. PATENT DOCUMENTS

| | | | |
|---|---|---|---|
| 7,722,746 | B1 | 5/2010 | Eyal |
| 2003/0159923 | A1 | 8/2003 | Bergman et al. |
| 2007/0042125 | A1* | 2/2007 | Yabe ............... C23C 18/40 427/443.1 |

FOREIGN PATENT DOCUMENTS

| | | |
|---|---|---|
| JP | 2004-502035 | 1/2004 |
| JP | 2009-190016 | 8/2009 |
| WO | WO 2016/134952 A1 | 9/2016 |
| WO | WO 2016/193738 A1 | 12/2016 |
| WO | WO 2017/025285 A1 | 2/2017 |
| WO | WO 2017/033131 A1 | 3/2017 |

OTHER PUBLICATIONS

Zengcai Liu, et al. "Electrochemical generation of syngas from water and carbon dioxide at industrially important rates", Journal of $CO_2$ Utilization, 15, 2016, 7 pages.

Sichao Ma, et al. "Efficient Electrochemical Flow System with Improved Anode for the Conversion of $CO_2$ to CO", Journal of the Electrochemical Society, 161, 10, 2014, 8 pages.

* cited by examiner

CARBON DIOXIDE ELECTROLYTIC DEVICE AND CARBON DIOXIDE ELECTROLYTIC METHOD

CROSS-REFERENCE TO RELATED APPLICATION

This application is based upon and claims the benefit of priority from Japanese Patent Application No. 2017-054570, filed on Mar. 21, 2017; the entire contents of which are incorporated herein by reference.

FIELD

Embodiments described herein generally relate to a carbon dioxide electrolytic device and a carbon dioxide electrolytic method.

BACKGROUND

In recent years, there has been a concern for depletion of fossil fuel such as petroleum or coal, and expectation for sustainably-usable renewable energy has been rising. As the renewable energy, a solar cell, wind power generation, and the like can be cited. Because these depend on weather and a natural situation in a power generation amount, there is a problem that stable supply of electric power is difficult. Therefore, there has been made an attempt to store the electric power generated by the renewable energy in a storage battery and stabilize the electric power. However, when the electric power is stored, there are problems that a cost is required for the storage battery and a loss occurs at a time of storage.

For such points, attention is being given to a technology of performing water electrolysis using the electric power generated by the renewable energy to produce hydrogen ($H_2$) from water or reducing carbon dioxide ($CO_2$) electrochemically to convert it into a chemical substance (chemical energy) such as a carbon compound such as carbon monoxide (CO), a formic acid (HCOOH), methanol ($CH_3OH$), methane ($CH_4$), an acetic acid ($CH_3COOH$), ethanol ($C_2H_5OH$), ethane ($C_2H_6$), or ethylene ($C_2H_4$). When these chemical substances are stored in a cylinder or a tank, as compared with when the electric power (electric energy) is stored in the storage battery, there are advantages that a storage cost of energy can be reduced and a storage loss is also small.

As a carbon dioxide electrolytic device, for example, a structure in which a cathode solution and $CO_2$ gas are brought in contact with a cathode and an anode solution is brought in contact with an anode is being studied. As a specific configuration of the electrolytic device, for example, there can be cited a configuration which includes a cathode solution flow path disposed along one surface of the cathode, a $CO_2$ gas flow path disposed along the other surface of the cathode, an anode solution flow path disposed along one surface of an anode, and a separator disposed between the cathode solution flow path and the anode solution flow path. When a reaction to, for example, produce CO from $CO_2$ is performed for a long time by using the electrolytic device having such a configuration and, for example, passing a constant current through the cathode and the anode, there is a problem that a deterioration over time of a cell output such as a decrease in a production amount of CO or an increase in a cell voltage occurs. Therefore, a carbon dioxide electrolytic device which makes it possible to suppress the deterioration over time of the cell output is required.

DETAILED DESCRIPTION

According to the embodiments of the present invention, there is provided a carbon dioxide electrolytic device that includes: an electrolysis cell including a cathode to reduce carbon dioxide and thus produce a carbon compound, an anode to oxidize water or hydroxide ions and thus produce oxygen, a carbon dioxide supply unit to supply carbon dioxide to the cathode, a solution supply unit to supply an electrolytic solution containing water to at least one of the cathode and the anode, and a separator to separate the anode and the cathode; a power supply connected to the anode and the cathode; a reaction control unit to cause a reduction reaction of the carbon dioxide in the cathode and an oxidation reaction of the water or hydroxide ions in the anode by passing an electric current from the power supply to the anode and the cathode; a refresh material supply unit including a gas supply unit to supply a gaseous substance as at least part of the refresh material to at least one of the anode and the cathode; and a refresh control unit which stops supply of the electric current from the power supply by the reaction control unit and stops supply of the carbon dioxide and the electrolytic solution, and operates the refresh material supply unit, based on request criteria of a cell output which is at least one of output values of the electrolysis cell.

Hereinafter, a carbon dioxide electrolytic device of embodiments will be described with reference to the drawings. In each embodiment presented below, substantially the same components are denoted by the same reference signs, and a description thereof is sometimes partially omitted. The drawings are schematic, and a relationship between a thickness and a planar size, thickness proportions of the respective portions, and the like are sometimes different from actual ones.

First Embodiment

Figure 1:
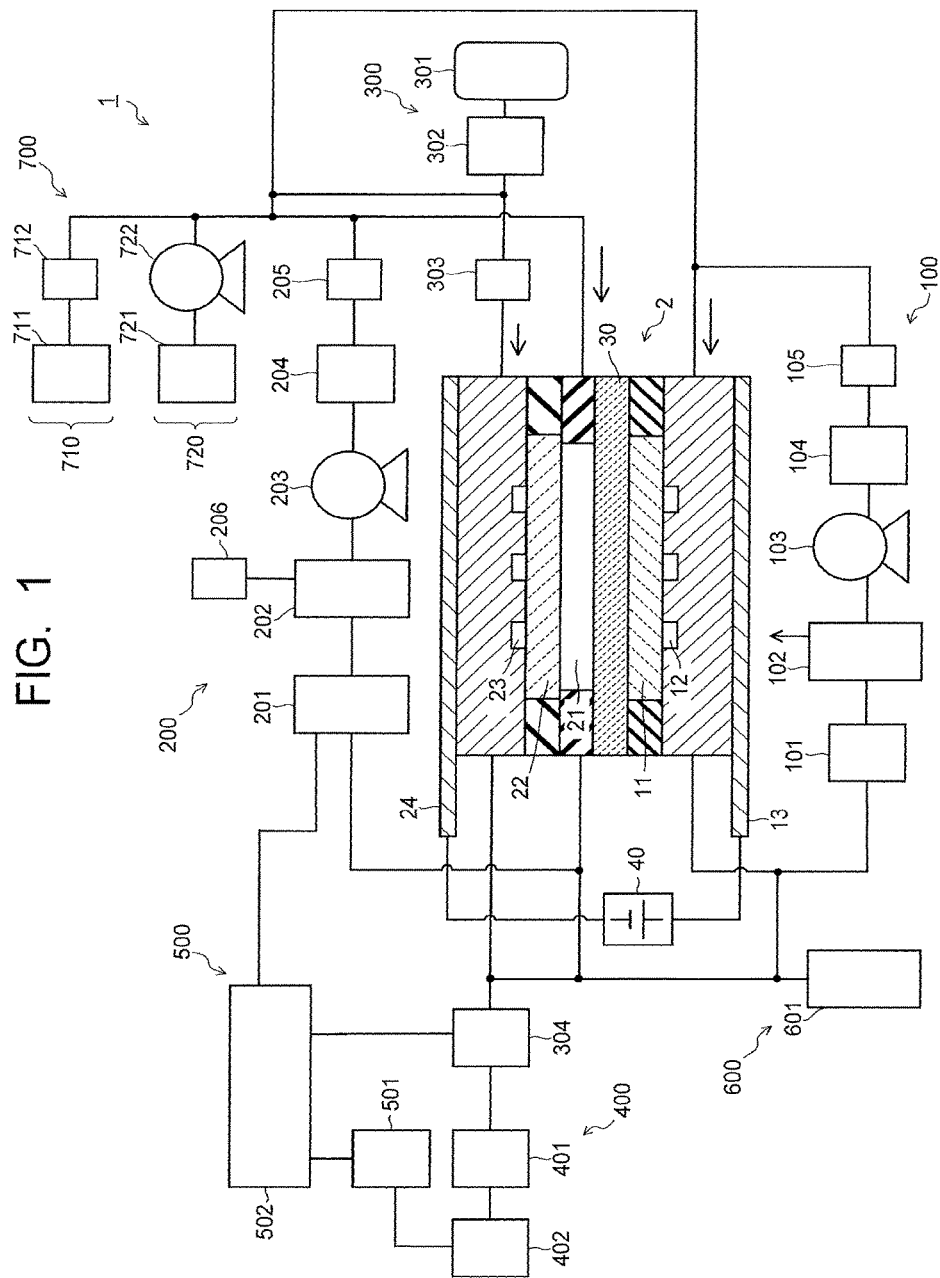
FIG. 1 is a view illustrating a carbon dioxide electrolytic device of a first embodiment.
Figure 2:
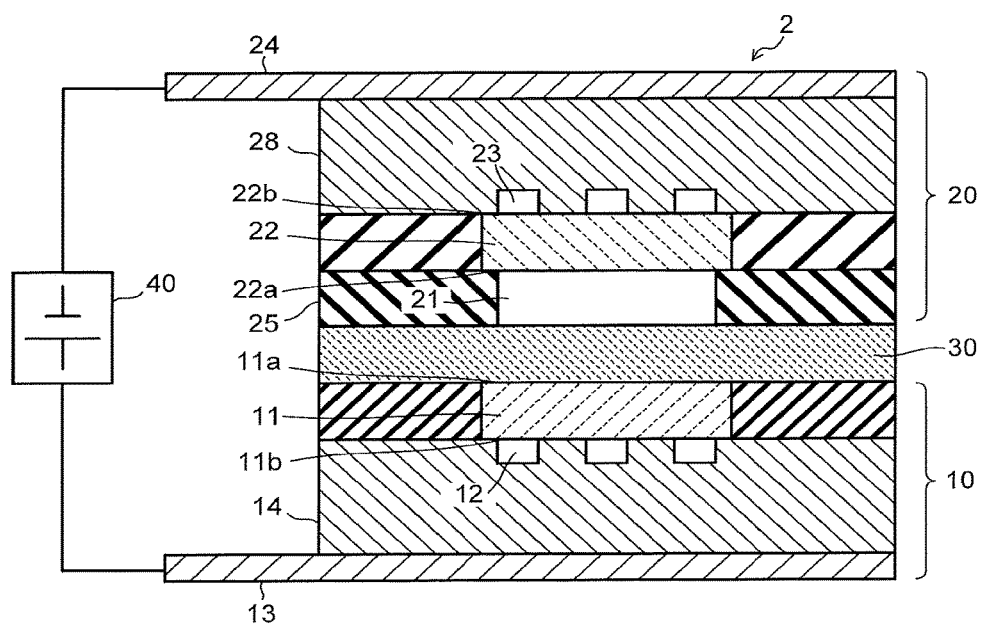
FIG. 2 is a sectional view illustrating an electrolysis cell of the carbon dioxide electrolytic device illustrated in FIG. 1.

FIG. 1 is a view illustrating a configuration of a carbon dioxide electrolytic device according to a first embodiment, and FIG. 2 is a sectional view illustrating a configuration of an electrolysis cell in the electrolytic device illustrated in FIG. 1. A carbon dioxide electrolytic device 1 illustrated in FIG. 1 includes: an electrolysis cell 2; an anode solution supply system 100 which supplies an anode solution to the electrolysis cell 2; a cathode solution supply system 200 which supplies a cathode solution to the electrolysis cell 2; a gas supply system 300 which supplies carbon dioxide ($CO_2$) gas to the electrolysis cell 2; a product collection system 400 which collects a product produced by a reduction reaction in the electrolysis cell 2; a control system 500 which detects a type and a production amount of the collected product and, performs control of the product and control of a refresh operation; a waste solution collection system 600 which collects a waste solution of the cathode solution or the anode solution; and a refresh material supply unit 700 which recovers an anode, a cathode, or the like of the electrolysis cell 2.

The electrolysis cell 2 includes an anode part 10, a cathode part 20, and a separator 30 as illustrated in FIG. 2. The anode part 10 includes an anode 11, an anode solution flow path 12, and an anode current collector 13. The cathode part 20 includes a cathode solution flow path 21, a cathode 22, a $CO_2$ gas flow path 23, and a cathode current collector 24. The separator 30 is disposed so as to separate the anode part 10 and the cathode part 20. The electrolysis cell 2 is sandwiched by a pair of support plates not illustrated, and further tightened by bolts or the like. In FIG. 1 and FIG. 2, a reference sign 40 is a power supply which passes an electric current through the anode 11 and the cathode 22. The power supply 40 is connected via a current introduction member to the anode 11 and the cathode 22. The power supply 40 is not limited to a normal system power supply, battery, or the like, and may be a power source which supplies electric power generated by renewable energy such as a solar cell or wind power generation.

The anode 11 is an electrode (oxidation electrode) which causes an oxidation reaction of water ($H_2O$) in an anode solution as an electrolytic solution to produce oxygen ($O_2$) or hydrogen ions ($H^+$), or causes an oxidation reaction of hydroxide ions ($OH^-$) produced in the cathode part 20 to produce oxygen ($O_2$) or water ($H_2O$). The anode 11 preferably has a first surface 11a in contact with the separator 30 and a second surface 11b facing the anode solution flow path 12. The first surface 11a of the anode 11 is in close contact with the separator 30. The anode solution flow path 12 supplies the anode solution to the anode 11, and is constituted by a pit (groove portion/concave portion) provided in a first flow path plate 14. The anode solution flows through in the anode solution flow path 12 so as to be in contact with the anode 11. The anode current collector 13 is electrically in contact with a surface on a side opposite to the anode 11 of the first flow path plate 14 constituting the anode solution flow path 12.

As described above, in the electrolysis cell 2 of the embodiment, the anode 11 and the separator 30 are brought in contact with each other. Oxygen ($O_2$) is produced in the anode 11, and at this time, in a cell structure in which a separator is sandwiched by a cathode solution flow path and an anode solution flow path, air bubbles of oxygen ($O_2$) gas which occur in the anode 11 stay in the anode solution flow path, and cell resistance between the anode and the separator (ion exchange membrane or the like) increases, and thereby a voltage variation of the anode sometimes becomes large. In response to such a point, the anode solution flow path 12 is not disposed between the anode 11 and the separator 30, and by bringing the anode 11 and the separator 30 in close contact with each other, oxygen gas which occurs in the anode 11 is discharged to the anode solution flow path 12 together with the anode solution. This makes it possible to prevent the oxygen gas from staying between the anode 11 and the separator 30 and suppress a variation in a cell voltage due to the voltage variation of the anode.

Figure 3:
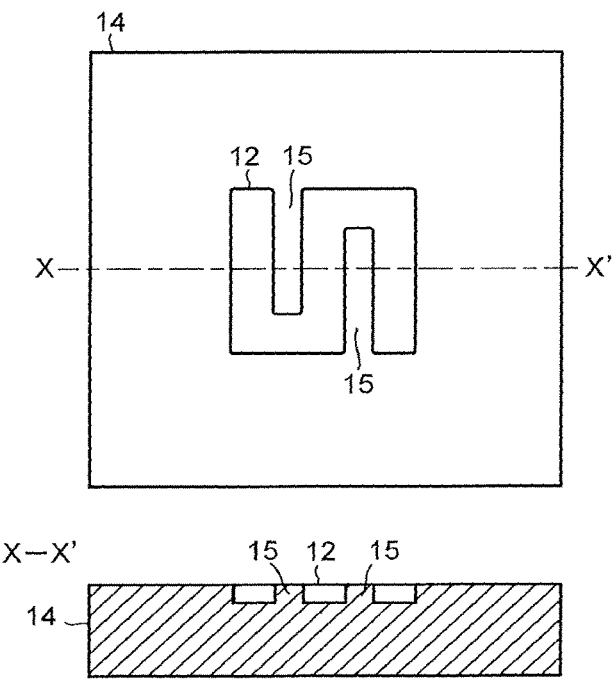
FIG. 3 is a view illustrating one example of an anode solution flow path in the electrolysis cell illustrated in FIG. 2.

For the first flow path plate 14, a solution inlet port and a solution outlet port whose illustrations are omitted are provided, and via these solution inlet port and solution outlet port, the anode solution is introduced and discharged by the anode solution supply system 100. For the first flow path plate 14, a material having low chemical reactivity and high conductivity is preferably used. As such a material, a metal material such as Ti or SUS, carbon, or the like can be cited. Along the anode solution flow path 12, as illustrated in FIG. 3, a plurality of lands (convex potions) 15 are preferably provided. The lands 15 are provided for mechanical retention and electrical continuity. The lands 15 are preferably provided alternately to uniformize flow of the anode solution. The above lands 15 make the anode solution flow path 12 serpentine. Moreover, also for a good discharge of the anode solution in which oxygen ($O_2$) gas is mixed, the lands 15 are preferably provided alternately along the anode solution flow path 12 to make the anode solution flow path 12 serpentine.

The anode 11 is preferably mainly constituted of a catalyst material (anode catalyst material) capable of oxidizing water ($H_2O$) to produce oxygen or hydrogen ions or oxidizing hydroxide ions ($OH^-$) to produce water or oxygen, and capable of reducing an overvoltage of the above reaction. As such a catalyst material, there can be cited a metal such as platinum (Pt), palladium (Pd), or nickel (Ni), an alloy or an intermetallic compound containing the above metals, a binary metal oxide such as a manganese oxide (Mn—O), an iridium oxide (Ir—O), a nickel oxide (Ni—O), a cobalt oxide (Co—O), an iron oxide (Fe—O), a tin oxide (Sn—O), an indium oxide (In—O), a ruthenium oxide (Ru—O), a lithium oxide (Li—O), or a lanthanum oxide (La—O), a ternary metal oxide such as Ni—Co—O, Ni—Fe—O, La—Co—O, Ni—La—O, or Sr—Fe—O, a quaternary metal oxide such as Pb—Ru—Ir—O or La—Sr—Co—O, or a metal complex such as a Ru complex or a Fe complex.

The anode 11 includes a base material having a structure capable of moving the anode solution or ions between the separator 30 and the anode solution flow path 12, for example, a porous structure such as a mesh material, a punching material, a porous body, or a metal fiber sintered body. The base material may be constituted of a metal such as titanium (Ti), nickel (Ni), or iron (Fe), or a metal material such as an alloy (for example, SUS) containing at least one of these metals, or may be constituted of the above-described anode catalyst material. When the oxide is used as the anode catalyst material, the anode catalyst material preferably adheres to or is stacked on a surface of the base material constituted of the above-described metal material to form a catalyst layer. The anode catalyst material preferably has nanoparticles, a nanostructure, a nanowire, or the like for the purpose of increasing the oxidation reaction. The nanostructure is a structure in which nanoscale irregularities are formed on a surface of the catalyst material.

The cathode 22 is an electrode (reduction electrode) which causes a reduction reaction of carbon dioxide ($CO_2$) or a reduction reaction of a carbon compound produced thereby to produce a carbon compound such as carbon monoxide (CO), methane ($CH_4$), ethane ($C_2H_6$), ethylene ($C_2H_4$), methanol ($CH_3OH$), ethanol ($C_2H_5OH$), or ethylene glycol ($C_2H_6O_2$). In the cathode 22, simultaneously with the reduction reaction of carbon dioxide ($CO_2$), a side reaction in which hydrogen ($H_2$) is produced by a reduction reaction of water ($H_2O$) is sometimes caused. The cathode 22 has a first surface 22a facing the cathode solution flow path 21 and a second surface 22b facing the $CO_2$ gas flow path 23. The cathode solution flow path 21 is disposed between the cathode 22 and the separator 30 so that the cathode solution as an electrolytic solution is in contact with the cathode 22 and the separator 30.

The cathode solution flow path 21 is constituted by an opening portion provided in a second flow path plate 25. For the second flow path plate 25, a solution inlet port and a solution outlet port whose illustrations are omitted are provided, and via these solution inlet port and solution outlet port, the cathode solution is introduced and discharged by the cathode solution supply system 200. The cathode solution flows through in the cathode solution flow path 21 so as to be in contact with the cathode 22 and the separator 30. For the second flow path plate 25 constituting the cathode solution flow path 21, a material having low chemical reactivity and having no conductivity is preferably used. As such a material, there can be cited an insulating resin material such as an acrylic resin, polyetheretherketone (PEEK), or a fluorocarbon resin.

Figure 4:
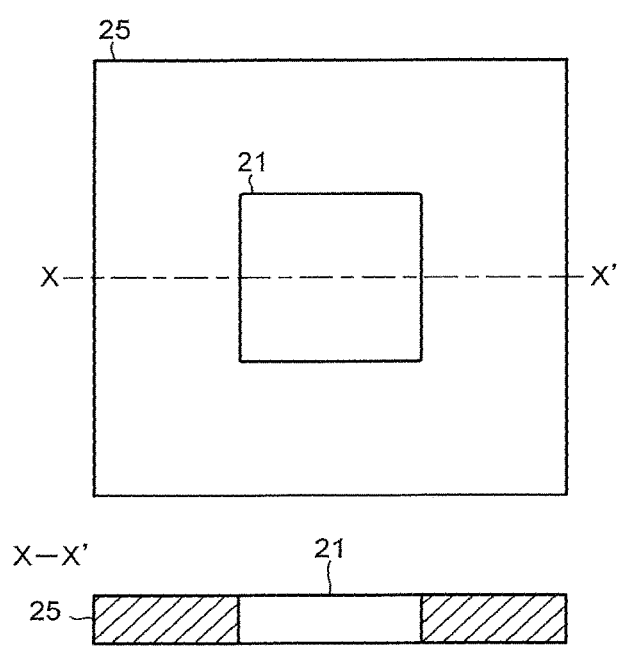
FIG. 4 is a view illustrating one example of a cathode solution flow path in the electrolysis cell illustrated in FIG. 2.
Figure 5:
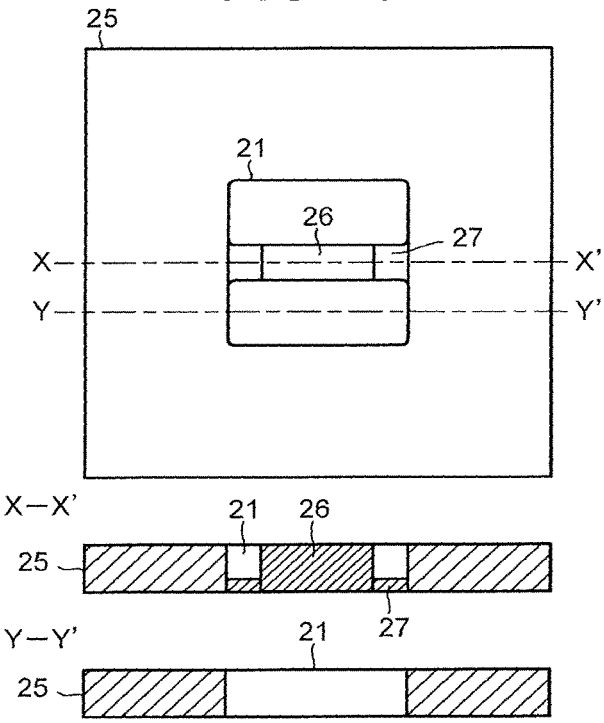
FIG. 5 is a view illustrating the other example of the cathode solution flow path in the electrolysis cell illustrated in FIG. 2.

In the cathode 22, the reduction reaction of $CO_2$ occurs mainly in a portion in contact with the cathode solution. Therefore, to the cathode solution flow path 21, as illustrated in FIG. 4, the opening portion having a large opening area is preferably applied. However, in order to enhance mechanical retention and electrical connectivity, as illustrated in FIG. 5, a land (convex portion) 26 may be provided in the cathode solution flow path 21. The land 26 in the cathode solution flow path 21 is provided in a center portion of the cathode solution flow path 21, and is retained to the second flow path plate 25 by a bridge portion 27 thinner than the land 26 so as not to prevent the cathode solution in the cathode solution flow path 21 from flowing through. When the land 26 is provided in the cathode solution flow path 21, the number of lands 26 is preferably small in order to reduce cell resistance.

The $CO_2$ gas flow path 23 is constituted by a pit (groove portion/concave portion) provided in a third flow path plate 28. For the third flow path plate 28 constituting the $CO_2$ gas flow path, a material having low chemical reactivity and high conductivity is preferably used. As such a material, the metal material such as Ti or SUS, carbon, or the like can be cited. Note that in each of the first flow path plate 14, the second flow path plate 25, and the third flow path plate 28, an inlet port and an outlet port for a solution or gas, screw holes for tightening, and the like, whose illustrations are omitted, are provided. Further, in front of and behind each of the flow path plates 14, 25, and 28, packing whose illustration is omitted is sandwiched as necessary.

Figure 6:
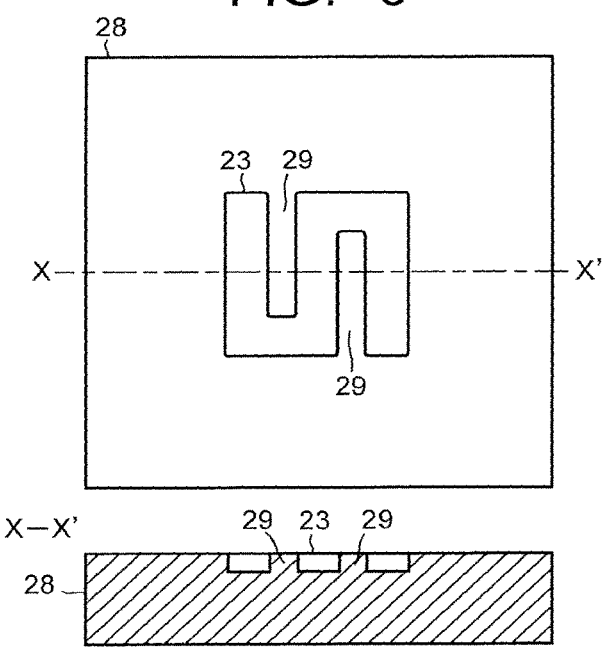
FIG. 6 is a view illustrating one example of a $CO_2$ gas flow path in the electrolysis cell illustrated in FIG. 2.

For the third flow path plate 28, a gas inlet port and a gas outlet port whose illustrations are omitted are provide, and via these gas inlet port and gas outlet port, $CO_2$ gas or gas (sometimes collectively referred to simply as $CO_2$ gas.) containing $CO_2$ is introduced and discharged by the gas supply system 300. The $CO_2$ gas flows through in the $CO_2$ gas flow path 23 so as to be in contact with the cathode 22. Along the $CO_2$ gas flow path 23, as illustrated in FIG. 6, a plurality of lands (convex potions) 29 are preferably provided. The lands 29 are provided for the mechanical retention and the electrical continuity. The lands 29 are preferably provided alternately, and this makes the $CO_2$ gas flow path 23 serpentine similarly to the anode solution flow path 12. The cathode current collector 24 is electrically in contact with a surface on a side opposite to the cathode 22 of the third flow path plate 28.

In the electrolysis cell 2 of the embodiment, providing the lands 15 and the lands 29 along the anode solution flow path 12 and the $CO_2$ gas flow path 23 makes it possible to increase a contact area between the anode 11 and the first flow path plate 14 constituting the anode solution flow path 12 and a contact area between the cathode 22 and the third flow path plate 28 constituting the $CO_2$ gas flow path 23. Further, providing the land 26 in the cathode solution flow path 21 makes it possible to increase a contact area between the cathode 22 and the second flow path plate 25 constituting the cathode solution flow path 21. These make electrical continuity between the anode current collector 13 and the cathode current collector 24 good while enhancing mechanical retentivity of the electrolysis cell 2, and make it possible to improve reduction reaction efficiency of $CO_2$, or the like.

Figure 7:
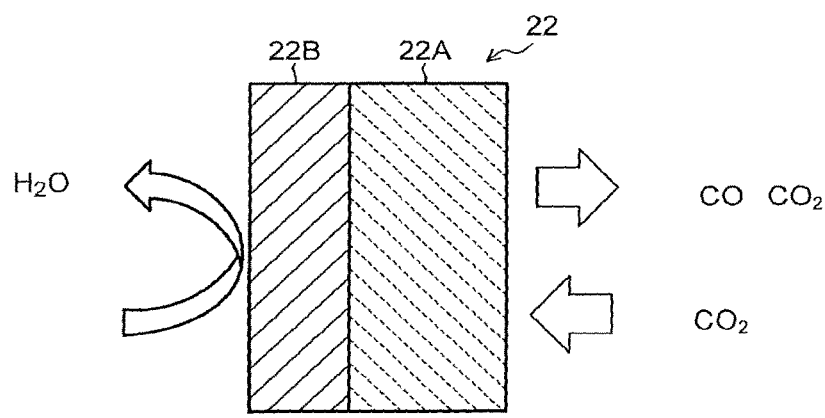
FIG. 7 is a view illustrating one example of a cathode in the electrolysis cell illustrated in FIG. 2.
Figure 8:
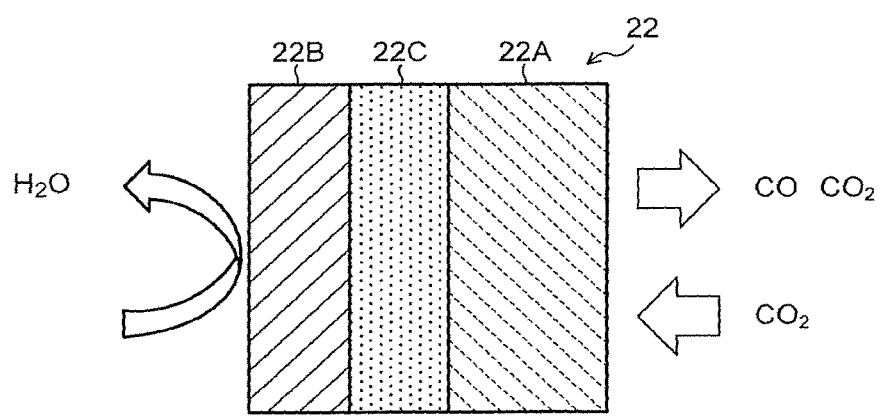
FIG. 8 is a view illustrating the other example of the cathode in the electrolysis cell illustrated in FIG. 2.
Figure 9:
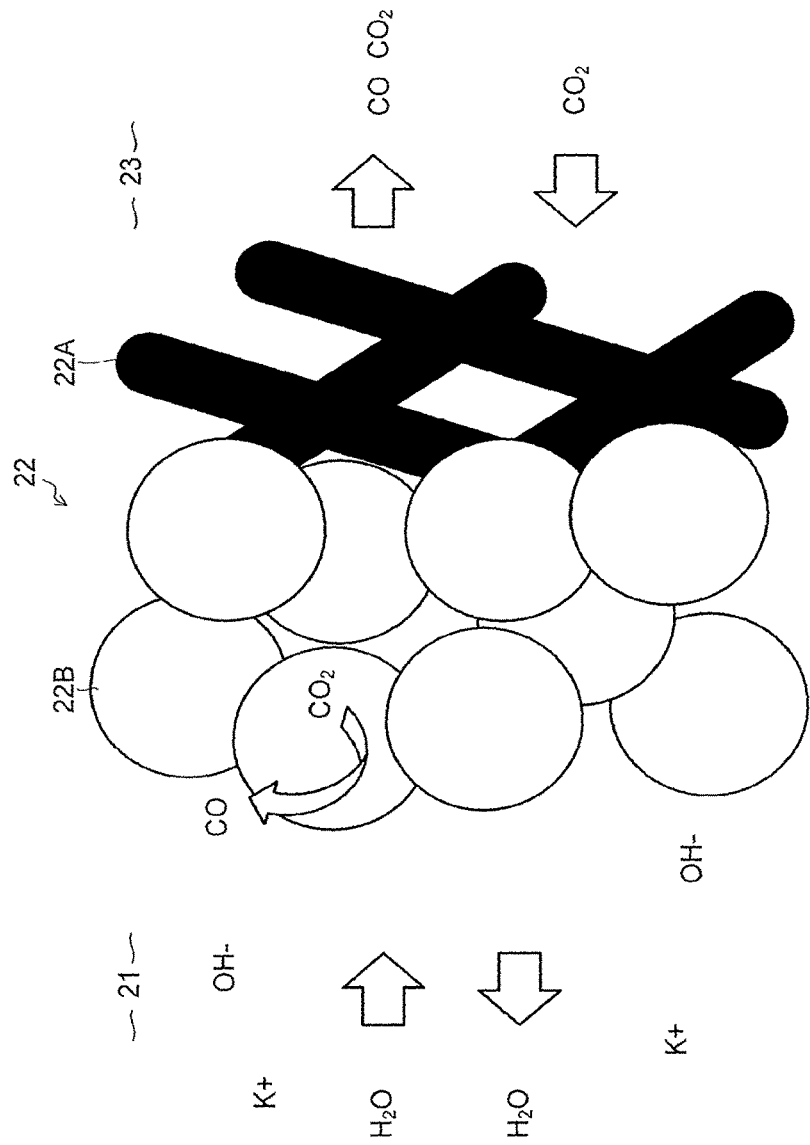
FIG. 9 is a view schematically illustrating a reaction in the cathode in the electrolysis cell illustrated in FIG. 2.

The cathode 22 has a gas diffusion layer 22A and a cathode catalyst layer 22B provided thereon as illustrated in FIG. 7. Between the gas diffusion layer 22A and the cathode catalyst layer 22B, as illustrated in FIG. 8, a porous layer 22C denser than the gas diffusion layer 22A may be disposed. As illustrated in FIG. 9, the gas diffusion layer 22A is disposed on the $CO_2$ gas flow path 23 side, and the cathode catalyst layer 22B is disposed on the cathode solution flow path 21 side. The cathode catalyst layer 22B may enter into the gas diffusion layer 22A. The cathode catalyst layer 22B preferably has catalyst nanoparticles, a catalyst nanostructure, or the like. The gas diffusion layer 22A is constituted by carbon paper, carbon cloth, or the like, for example, and subjected to water repellent treatment. The porous layer 22C is constituted by a porous body whose pore size is smaller than that of the carbon paper or the carbon cloth.

As illustrated in a schematic view in FIG. 9, in the cathode catalyst layer 22B, the cathode solution or ions are supplied and discharged from the cathode solution flow path 21. In the gas diffusion layer 22A, the $CO_2$ gas is supplied from the $CO_2$ gas flow path 23 and further a product by the reduction reaction of the $CO_2$ gas is discharged. By subjecting the gas diffusion layer 22A to moderate water repellent treatment, the $CO_2$ gas reaches the cathode catalyst layer 22B mainly owing to gas diffusion. The reduction reaction of $CO_2$ or the reduction reaction of a carbon compound produced thereby occurs in the vicinity of a boundary between the gas diffusion layer 22A and the cathode catalyst layer 22B or in the vicinity of the cathode catalyst layer 22B which enters into the gas diffusion layer 22A, a gaseous product is discharged mainly from the $CO_2$ gas flow path 23, and a liquid product is discharged mainly from the cathode solution flow path 21.

The cathode catalyst layer 22B is preferably constituted of a catalyst material (cathode catalyst material) capable of reducing carbon dioxide to produce a carbon compound and further reducing the carbon compound produced thereby to produce a carbon compound as necessary, and capable of reducing an overvoltage of the above reaction. As such a material, there can be cited a metal such as gold (Au), silver (Ag), copper (Cu), platinum (Pt), palladium (Pd), nickel (Ni), cobalt (Co), iron (Fe), manganese (Mn), titanium (Ti), cadmium (Cd), zing (Zn), indium (In), gallium (Ga), lead (Pb), or tin (Sn), a metal material such as an alloy or an intermetallic compound containing at least one of the above metals, a carbon material such as carbon (C), graphene, CNT (carbon nanotube), fullerene, or ketjen black, or a metal complex such as a Ru complex or a Re complex. To the cathode catalyst layer 22B, various shapes such as a plate shape, a mesh shape, a wire shape, a particle shape, a porous shape, a thin film shape, and an island shape can be applied.

The cathode catalyst material constituting the cathode catalyst layer 22B preferably has nanoparticles of the above-described metal material, a nanostructure of the metal material, a nanowire of the metal material, or a composite body in which the nanoparticles of the above-described metal material are supported by a carbon material such as carbon particles, a carbon nanotube, or graphene. Applying catalyst nanoparticles, a catalyst nanostructure, a catalyst nanowire, a catalyst nano-support structure, or the like as the cathode catalyst material makes it possible to enhance reaction efficiency of the reduction reaction of carbon dioxide in the cathode 22.

The separator 30 is constituted of an ion exchange membrane or the like capable of moving ions between the anode 11 and the cathode 22 and separating the anode part 10 and the cathode part 20. As the ion exchange membrane, for example, a cation exchange membrane such as Nafion or Flemion, or an anion exchange membrane such as Neosepta, or Selemion can be used. As described later, when an alkaline solution is used as the anode solution or the cathode solution and it is assumed that hydroxide ions ($OH^-$) move mainly, the separator 30 is preferably constituted of the anion exchange membrane. However, also other than the ion exchange membrane, a glass filter, a porous polymeric membrane, or a porous insulating material may be applied to the separator 30 as long as they are a material capable of moving ions between the anode 11 and the cathode 22.

The anode solution and the cathode solution as the electrolytic solution are preferably a solution containing at least water ($H_2O$). Because carbon dioxide ($CO_2$) is supplied from the $CO_2$ gas flow path 23, the cathode solution may contain or need not contain carbon dioxide ($CO_2$). To the anode solution and the cathode solution, the same solution may be applied or different solutions may be applied. As a solution used as the anode solution and the cathode solution and containing $H_2O$, an aqueous solution containing an arbitrary electrolyte can be cited. As the aqueous solution containing the electrolyte, for example, there can be cited an aqueous solution containing at least one selected from a hydroxide ion ($OH^-$), a hydrogen ion ($H^+$), a potassium ion ($K^+$), a sodium ion ($Na^+$), a lithium ion ($Li^+$), a chloride ion ($Cl^-$), a bromide ion ($Br^-$), an iodide ion ($I^-$), a nitrate ion ($NO_3^-$), a sulfate ion ($SO_4^{2-}$), a phosphate ion ($PO_4^{2-}$), a borate ion ($BO_3^{3-}$), and a hydrogen carbonate ion ($HCO_3^-$). In order to reduce electrical resistance of the electrolytic solution, as the anode solution and the cathode solution, an alkaline solution in which an electrolyte such as a potassium hydroxide or a sodium hydroxide is dissolved in high concentration is preferably used.

For the cathode solution, an ionic liquid which is made of salts of cations such as imidazolium ions or pyridinium ions and anions such as $BF_4^-$ or $PF_6^-$ and which is in a liquid state in a wide temperature range, or its aqueous solution may be used. As another cathode solution, there can be cited an amine solution of ethanolamine, imidazole, pyridine, or the like, or an aqueous solution thereof. As amine, any of primary amine, secondary amine, and tertiary amine is applicable.

To the anode solution flow path 12 of the anode part 10, the anode solution is supplied from the anode solution supply system 100. The anode solution supply system 100 circulates the anode solution so that the anode solution flows through in the anode solution flow path 12. The anode solution supply system 100 has a pressure control unit 101, an anode solution tank 102, a flow rate control unit (pump) 103, a reference electrode 104, and a pressure gauge 105, and is constituted so that the anode solution circulates in the anode solution flow path 12. The anode solution tank 102 is connected to a gas component collection unit which collects a gas component such as oxygen ($O_2$) contained in the circulating anode solution and is not illustrated. The anode solution, whose flow rate and pressure are controlled in the pressure control unit 101 and the flow rate control unit 103, is introduced to the anode solution flow path 12.

To the cathode solution flow path 21 of the cathode part 20, the cathode solution is supplied from the cathode solution supply system 200. The cathode solution supply system 200 circulates the cathode solution so that the cathode solution flows through in the cathode solution flow path 21. The cathode solution supply system 200 has a pressure control unit 201, a cathode solution tank 202, a flow rate control unit (pump) 203, a reference electrode 204, and a pressure gauge 205, and is constituted so that the cathode solution circulates in the cathode solution flow path 21. The cathode solution tank 202 is connected to a gas component collection unit 206 which collects a gas component such as carbon monoxide (CO) contained in the circulating cathode solution. The cathode solution, whose flow rate and pressure are controlled in the pressure control unit 201 and the flow rate control unit 203, is introduced to the cathode solution flow path 21.

To the $CO_2$ gas flow path 23, the $CO_2$ gas is supplied from the gas supply system 300. The gas supply system 300 has a $CO_2$ gas cylinder 301, a flow rate control unit 302, a pressure gauge 303, and a pressure control unit 304. The $CO_2$ gas, whose flow rate and pressure are controlled in the flow rate control unit 302 and the pressure control unit 304, is introduced to the $CO_2$ gas flow path 23. The gas supply system 300 is connected to the product collection system 400 which collects a product in gas which has flowed through the $CO_2$ gas flow path 23. The product collection system 400 has a gas/liquid separation unit 401 and a product collection unit 402. A reduction product such as CO or $H_2$ contained in the gas which has flowed through the $CO_2$ gas flow path 23 is accumulated via the gas/liquid separation unit 401 in the product collection unit 402.

The anode solution and the cathode solution circulate in the anode solution flow path 12 and the cathode solution flow path 21 at a time of an electrolytic reaction operation as described above. At a time of the later-described refresh operation of the electrolysis cell 2, the anode solution and the cathode solution are discharged to the waste solution collection system 600 so that the anode 11, the anode solution flow path 12, the cathode 22, the cathode solution flow path 21, and the like are exposed from the anode solution and the cathode solution. The waste solution collection system 600 has a waste solution collection tank 601 connected to the anode solution flow path 12 and the cathode solution flow path 21. Waste solutions of the anode solution and the cathode solution are collected in the waste solution collection tank 601 by opening and closing unillustrated valves. Opening and closing of the valves, or the like is controlled collectively by the control system 500. The waste solution collection tank 601 also functions as a collection unit of a rinse solution to be supplied from the refresh material supply unit 700. Moreover, a gaseous substance to be supplied from the refresh material supply unit 700 and to partially contain a liquid substance is also collected by the waste solution collection tank 601 as necessary.

The refresh material supply unit 700 includes a gaseous substance supply system 710 and a rinse solution (liquid) supply system 720. Note that the rinse solution supply system 720 can be omitted in some cases. The refresh material supply unit 700 may include supply system 710 which supplies the gaseous substance as at least part of the refresh material. The gaseous substance supply system 710 has a gas tank 711 which becomes a supply source of a gaseous substance such as air, carbon dioxide, oxygen, nitrogen, or argon, and a pressure control unit 712 which controls a supply pressure of the gaseous substance. The rinse solution supply system 720 has a rinse solution tank 721 which becomes a supply source of a rinse solution such as water and a flow rate control unit (pump) 722 which controls a supply flow rate or the like of the rinse solution. The gaseous substance and rinse solution supply systems 710 and 720 are connected via pipes to the anode solution flow path 12, the cathode solution flow path 21, and the $CO_2$ gas flow path 23. The gaseous substance and the rinse solution are supplied to each of the flow paths 12, 21, and 23 by opening and closing unillustrated valves. Opening and closing of the valves, or the like is controlled collectively by the control system 500.

Part of the reduction product accumulated in the product collection unit 402 is sent to a reduction performance detection unit 501 of the control system 500. In the reduction performance detection unit 501, a production amount and a proportion of each product such CO or $H_2$ in the reduction product are detected. The detected production amount and proportion of each product are inputted to a data collection control unit 502 of the control system 500. Moreover, the data collection control unit 502 collects a cell output which is at least one of electrical values (electrical data) of the electrolysis cell 2. As the cell output of the electrolysis cell 2, there can be cited a cell voltage, a cell current, a cathode potential, and an anode potential. The data collection control unit 502 is electrically connected via bi-directional signal lines whose illustration is partially omitted to the pressure control unit 101 and the flow rate control unit 103 of the anode solution supply system 100, the pressure control unit 201 and the flow rate control unit 203 of the cathode solution supply system 200, the flow rate control unit 302 and the pressure control unit 304 of the gas supply system 300, and the pressure control unit 712 and the flow rate control unit 722 of the refresh material supply unit 700 in addition to the reduction performance detection unit 501, and these are collectively controlled. Note that an unillustrated valve is provided on each pipe, and an opening/closing operation of the valve is controlled by a signal from the data collection control unit 502.

Figure 10:
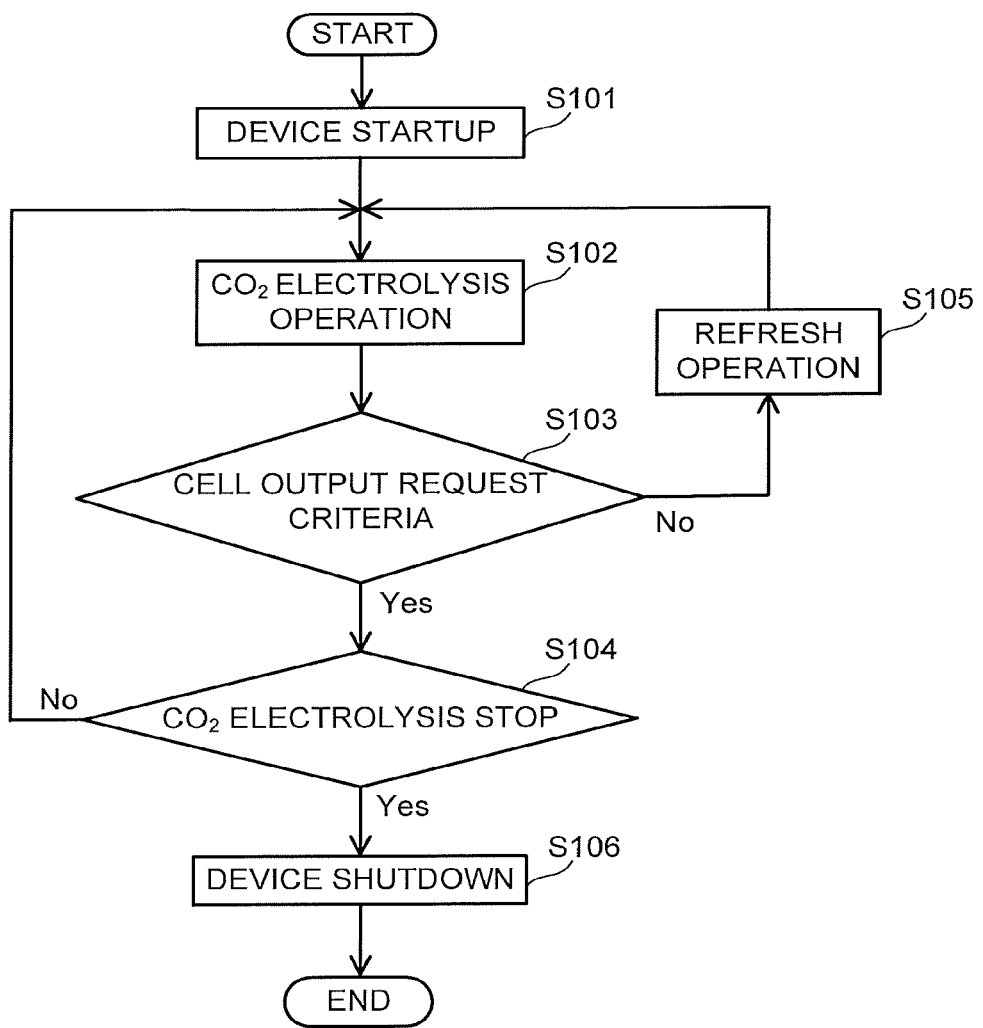
FIG. 10 is a chart illustrating a working step of the carbon dioxide electrolytic device of the first embodiment.

A working operation of the carbon dioxide electrolytic device 1 of the embodiment will be described. First, as illustrated in FIG. 10, a start-up step S101 of the electrolytic device 1 is performed. In the start-up step S101 of the electrolytic device 1, the following operation is performed. In the anode solution supply system 100, a flow rate and a pressure are controlled by the pressure control unit 101 and the flow rate control unit 103, and the anode solution is introduced to the anode solution flow path 12. In the cathode solution supply system 200, a flow rate and a pressure are controlled by the pressure control unit 201 and the flow rate control unit 203, and the cathode solution is introduced to the cathode solution flow path 21. In the gas supply system 300, a flow rate and a pressure are controlled by the flow rate control unit 302 and the pressure control unit 304, and $CO_2$ gas is introduced to the $CO_2$ gas flow path 23.

Next, a $CO_2$ electrolysis operation step S102 is performed. In the $CO_2$ electrolysis operation step S102, an output from the power supply 40 of the electrolytic device 1 in which the start-up step S101 has been performed is started, and an electric current is supplied by applying voltage between the anode 11 and the cathode 22. Passing the electric current between the anode 11 and the cathode 22 causes an oxidation reaction in the vicinity of the anode 11 and a reduction reaction in the vicinity of the cathode 22 which are presented below. Here, a case of producing carbon monoxide (CO) as the carbon compound is mainly described, but the carbon compound as the reduction product of carbon dioxide is not limited to carbon monoxide, and may be other carbon compounds such as the above-described organic compounds. Further, as a reaction process by the electrolysis cell 2, a case of mainly producing hydrogen ions ($H^+$) and a case of mainly producing hydroxide ions ($OH^-$) are considered, but it is not limited to either of these reaction processes.

First, the reaction process in a case of mainly oxidizing water ($H_2O$) to produce hydrogen ions ($H^+$) is described. When an electric current is supplied from the power supply 40 between the anode 11 and the cathode 22, the oxidation reaction of water ($H_2O$) occurs in the anode 11 in contact with the anode solution. Specifically, as indicated by the following (1) formula, $H_2O$ contained in the anode solution is oxidized and oxygen ($O_2$) and hydrogen ions ($H^+$) are produced.

$$2H_2O \rightarrow 4H^+ + O_2 + 4e^- \tag{1}$$

H' produced in the anode 11 moves in the anode solution existing in the anode 11, the separator 30, and the cathode solution in the cathode solution flow path 21 and reaches the vicinity of the cathode 22. The reduction reaction of carbon dioxide ($CO_2$) occurs by electrons ($e^-$) based on the electric current which is supplied from the power supply 40 to the cathode 22 and $H^+$ which moves to the vicinity of the cathode 22. Specifically, as indicated by the following (2) formula, $CO_2$ supplied from the $CO_2$ gas flow path 23 to the cathode 22 is reduced and CO is produced.

$$2CO_2 + 4H^+ + 4e^- \rightarrow 2CO + 2H_2O \tag{2}$$

Next, the reaction process in a case of mainly reducing carbon dioxide ($CO_2$) to produce hydroxide ions ($OH^-$) is described. When an electric current is supplied from the power supply 40 between the anode 11 and the cathode 22, in the vicinity of the cathode 22, as indicated by the following (3) formula, water ($H_2O$) and carbon dioxide ($CO_2$) are reduced and carbon monoxide (CO) and hydroxide ions ($OH^-$) are produced. The hydroxide ions ($OH^-$) diffuse in the vicinity of the anode 11, and as indicated by the following (4) formula, the hydroxide ions ($OH^-$) are oxidized and oxygen ($O_2$) is produced.

$$2CO_2 + 2H_2O + 4e^- \rightarrow 2CO + 4OH^- \tag{3}$$

$$4OH^- \rightarrow 2H_2O + O_2 + 4e^- \tag{4}$$

In the above-described reaction processes in the cathode 22, the reduction reaction of $CO_2$ is considered to occur in the vicinity of the boundary between the gas diffusion layer 22A and the cathode catalyst layer 22B as described above. At this time, the cathode solution flowing through the cathode solution flow path 21 enters up to the gas diffusion layer 22A or the cathode catalyst layer 22B has excess water, and thereby a disadvantage such as a decrease in the production amount of CO by the reduction reaction of $CO_2$ or an increase in the cell voltage occurs. Such a decrease in the cell output of the electrolysis cell 2 is also caused by deviation of distribution of ions and residual gas in the vicinities of the anode 11 and the cathode 22, precipitation of an electrolyte in the cathode 22 and the anode 11, further the precipitation of an electrolyte in the anode solution flow path 12 and the cathode solution flow path 21, and the like. In order to detect such a decrease in the cell output, a step S103 in which a determination is made whether the cell output satisfies request criteria or not is performed.

The data collection control unit 502 collects the production amount and the proportion of each product and the cell output such as the cell voltage, the cell current, the cathode potential, and the anode potential regularly or continuously as described above, for example. Moreover, in the data collection control unit 502, the request criteria of the cell output are set beforehand, and a determination is made whether collected data satisfies the set request criteria or not. When the collected data satisfies the set request criteria, the $CO_2$ electrolysis operation S102 is continued without performing a $CO_2$ electrolysis stop (S104). When the collected data does not satisfy the set request criteria, a refresh operation step S105 is performed.

As the request criteria of the cell output which is collected by the data collection control unit 502, there can be cited an upper limit value of a cell voltage at a time of passing a constant current through the electrolysis cell 2, a lower limit value of a cell current at a time of applying a constant voltage to the electrolysis cell 2, Faradaic efficiency of the carbon compound produced by the reduction reaction of $CO_2$, and so on. Here, the Faradaic efficiency is defined as a proportion of an electric current contributing to production of an intended carbon compound to an entire electric current passing through the electrolysis cell 2. In order to maintain electrolysis efficiency, when the upper limit value of the cell voltage at a time of passing a constant current reaches 150% or more, preferably 120% or more relative to a set value, it is preferable to perform the refresh operation step S105. Further, when the lower limit value of the cell current at a time of applying a constant voltage reaches 50% or less, preferably 80% or less relative to a set value, it is preferable to perform the refresh operation step S105. In order to maintain a production amount of the reduction product such as the carbon compound, when the Faradaic efficiency of the carbon compound becomes 50% or less, preferably 80% or less relative to a set value, it is preferable to perform the refresh operation step S105.

In the determination of the cell output, for example, when one of the cell voltage, the cell current, and the Faradaic efficiency of the carbon compound does not satisfy the request criteria, the cell output is determined as not satisfying the request criteria, and the refresh operation step S105 is performed. Further, the request criteria of the cell output may be set in combination of two or more of the the cell voltage, the cell current, and the Faradaic efficiency of the carbon compound. For example, when neither the cell voltage nor the Faradaic efficiency of the carbon compound satisfies the request criteria, the refresh operation step S105 may be performed. The refresh operation step S105 is performed when at least one of the cell output does not satisfy the request criteria. In order to perform the $CO_2$ electrolysis operation step S102 stably, the refresh operation step S105 is preferably performed at an interval of one hour or more.

Figure 11:
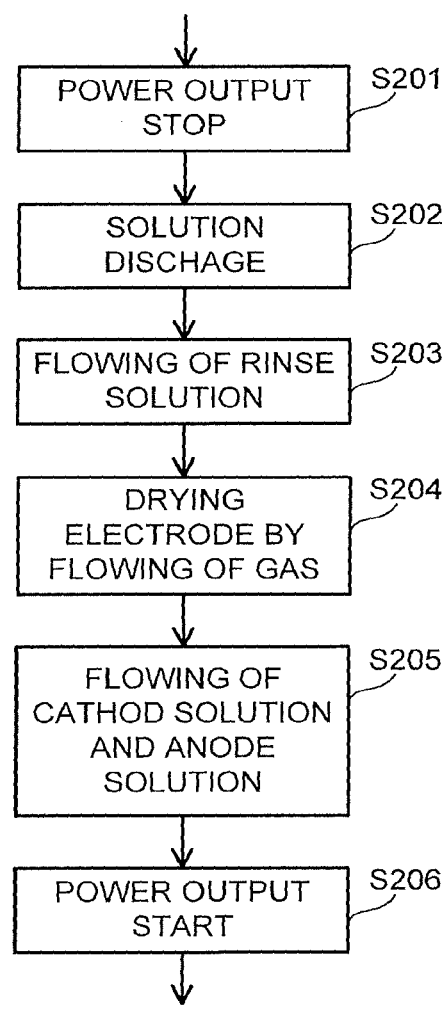
FIG. 11 is a chart illustrating a refresh step of the carbon dioxide electrolytic device of the first embodiment.

The refresh operation step S105 is performed according to a flow chart illustrated in FIG. 11, for example. First, by stopping an output of the power supply 40 (S201), the reduction reaction of $CO_2$ is stopped. Next, the cathode solution and the anode solution are discharged from the cathode solution flow path 21 and the anode solution flow path 12 (S202). Next, the rinse solution is supplied to the cathode solution flow path 21 and the anode solution flow path 12 (S203), and washing is performed. Next, by supplying gas to the cathode solution flow path 21 and the anode solution flow path 12 (S204), the cathode 22 and the anode 11 are dried. When the above refresh operation finishes, the cathode solution is introduced to the cathode solution flow path 21, the anode solution is introduced to the anode solution flow path 12, and $CO_2$ gas is introduced to the $CO_2$ gas flow path 23 (S205). Then, by starting the output of the power supply 40 (S206), the $CO_2$ electrolysis operation is resumed. For the discharge of the cathode solution and the anode solution from each of the flow paths 12 and 21, gas may be used or the rinse solution may be used.

The rinse solution supply and flow (S203) are performed in order to prevent precipitation of an electrolyte contained the cathode solution and the anode solution and wash the cathode 22, the anode 11, and each of the flow paths 12 and 21. Therefore, water is preferable for the rinse solution, water having electric conductivity of 1 mS/m or less is more preferable, and water having the electric conductivity of 0.1 mS/m or less is further preferable. In order to remove a precipitate such as the electrolyte in the cathode 22, the anode 11, and the like, an acid rinse solution having a low concentration, of sulfuric acid, nitric acid, hydrochloric acid, or the like may be supplied, and thereby the electrolyte may be dissolved. When the acid rinse solution having a low concentration is used, a step in which the rinse solution of water is supplied is performed in a step thereafter. Just before the gas supply step, in order to prevent an additive contained in the rinse solution from remaining, the supply step of the rinse solution of water is preferably performed. FIG. 1 illustrates the rinse solution supply system 720 having one rinse solution tank 721, but when a plurality of rinse solutions such as water and the acid rinse solution are used, a plurality of rinse solution tanks 721 corresponding thereto are used.

The gas to be used for the gas supply and flow step S204 preferably contains at least one of air, carbon dioxide, oxygen, nitrogen, and argon. Moreover, gas having low chemical reactivity is preferably used. Form such a point, air, nitrogen, and argon are preferably used, and further nitrogen and argon are more preferable. The supply of the rinse solution and gas for refresh is not limited only to the cathode solution flow path 21 and the anode solution flow path 12, and in order to wash a surface of the cathode 22 in contact with the $CO_2$ gas flow path 23, the rinse solution and the gas may be supplied to the $CO_2$ gas flow path 23. In order to dry the cathode 22 also from the surface side in contact with the $CO_2$ gas flow path 23, it is effective to supply the gas to the $CO_2$ gas flow path 23.

A case of supplying the rinse solution and gas for refresh to both the anode part 10 and the cathode part 20 is described in the above, but the rinse solution and gas for refresh may be supplied to only one of either the anode part 10 or the cathode part 20. For example, the Faradaic efficiency of the carbon compound varies depending on a contact region between the cathode solution and $CO_2$ in the gas diffusion layer 22A and the cathode catalyst layer 22B of the cathode 22. In such a case, only by supplying the rinse solution and gas for refresh to only the cathode part 20, the Faradaic efficiency of the carbon compound is sometimes recovered. Depending on a type of the electrolytic solutions (anode solution and cathode solution) to be used, there is sometimes a tendency to easily precipitate in either the anode part 10 or the cathode part 20. Based on such a tendency of the electrolytic device 1, the rinse solution and gas for refresh may be supplied to only one of either the anode part 10 or the cathode part 20. Moreover, depending on an operating time or the like of the electrolytic device 1, the cell output is sometimes recovered only by drying the anode 11 and the cathode 22. In such a case, only the gas for refresh may be supplied to at least one of the anode part 10 and the cathode part 20. In the refresh operation step S105, changes are variously possible according to an operation condition, a tendency, or the like of the electrolytic device 1.

As described above, in the electrolytic device 1 of the first embodiment, based on whether the cell output of the electrolysis cell 2 satisfies the request criteria or not, a determination is made whether the $CO_2$ electrolysis operation step S102 is continued or whether the refresh operation step S105 is performed. By supplying the rinse solution and gas for refresh in the refresh operation step S105, the entry of the cathode solution into the gas diffusion layer 22A, the water excess of the cathode catalyst layer 22B, the deviation of the distribution of the ions and the residual gas in the vicinities of the anode 11 and the cathode 22, and the precipitation of the electrolyte in the cathode 22, the anode 11, the anode solution flow path 12, and the cathode solution flow path 21, and the like, which become a decrease factor of the cell output, are removed. Accordingly, by resuming the $CO_2$ electrolysis operation step S102 after the refresh operation step S105, the cell output of the electrolysis cell 2 can be recovered. Repeating the above $CO_2$ electrolysis operation step S102 and refresh operation step S105 based on the request criteria of the cell output makes it possible to maintain $CO_2$ electrolysis performance by the electrolytic device 1 for a long stretch of time.

Second Embodiment

Figure 12:
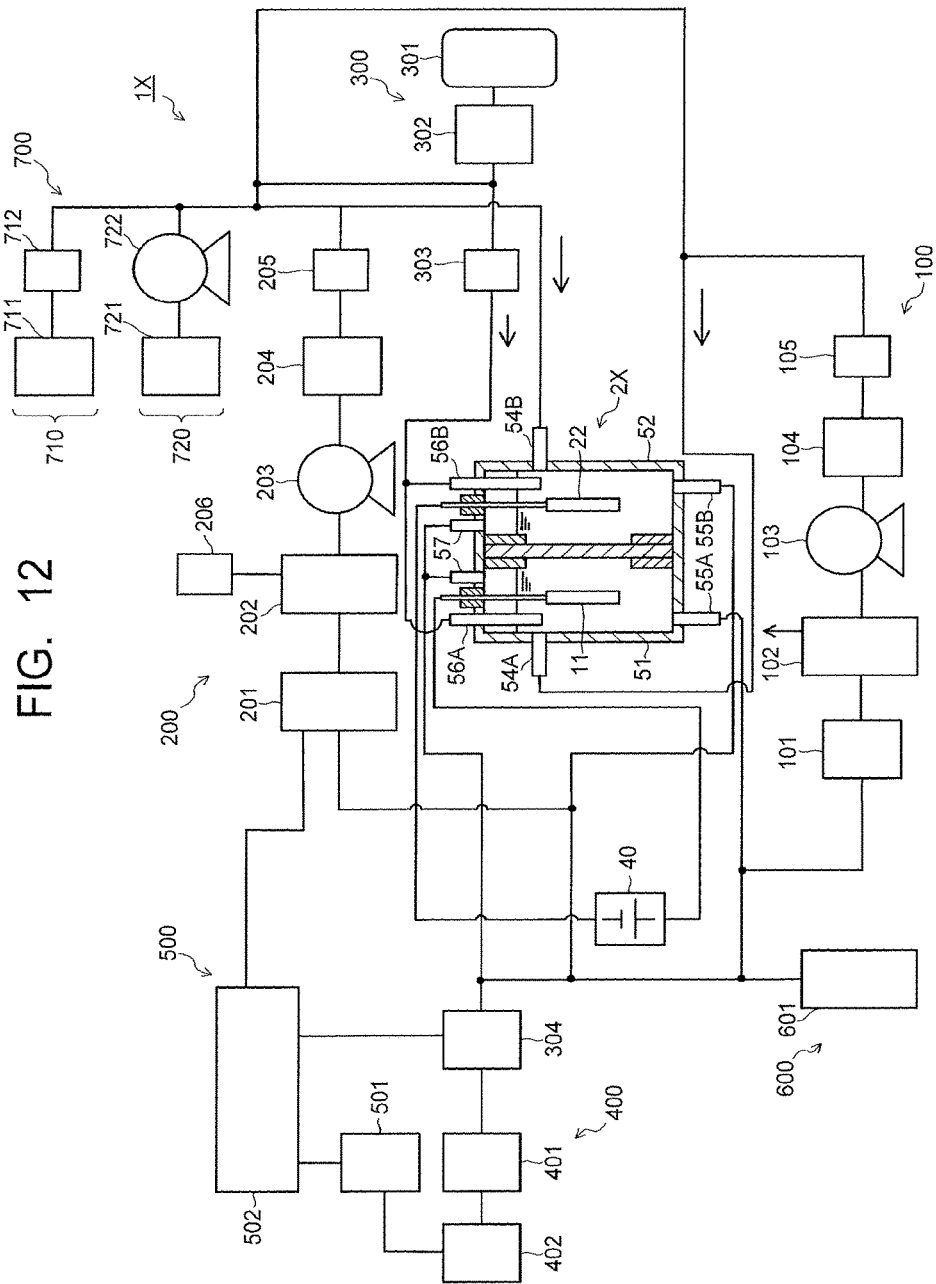
FIG. 12 is a view illustrating a carbon dioxide electrolytic device of a second embodiment.
Figure 13:
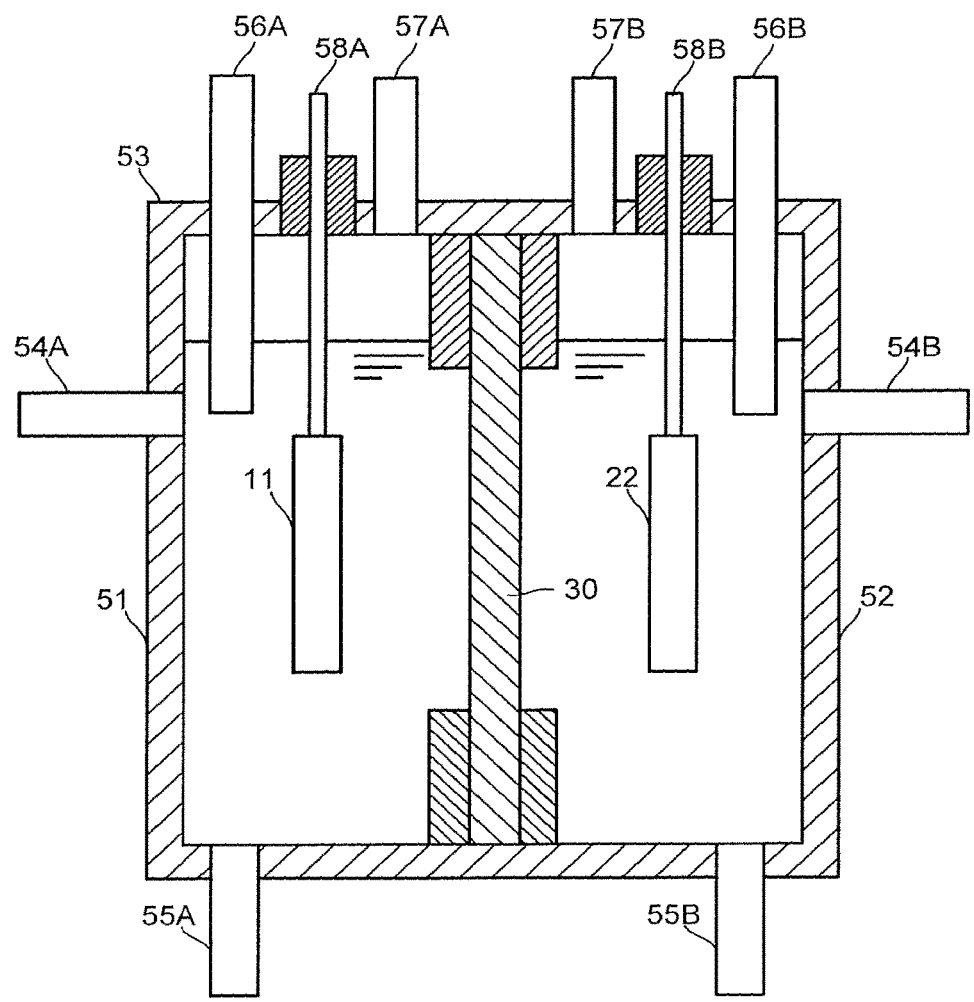
FIG. 13 is a sectional view illustrating an electrolysis cell of the carbon dioxide electrolytic device illustrated in FIG. 12.

FIG. 12 is a view illustrating a configuration of a carbon dioxide electrolytic device according to a second embodiment, and FIG. 13 is a sectional view illustrating a configuration of an electrolysis cell in the electrolytic device illustrated in FIG. 12. A carbon dioxide electrolytic device 1X illustrated in FIG. 12 includes: an electrolysis cell 2X; an anode solution supply system 100 which supplies an anode solution to the electrolysis cell 2X; a cathode solution supply system 200 which supplies a cathode solution to the electrolysis cell 2X; a gas supply system 300 which supplies carbon dioxide ($CO_2$) gas to the electrolysis cell 2X; a product collection system 400 which collects a product produced by a reduction reaction in the electrolysis cell 2X; a control system 500 which detects a type and a production amount of the collected product and, performs control of the product and control of a refresh operation; a waste solution collection system 600 which collects a waste solution of the cathode solution or the anode solution; and a refresh material supply unit 700 which recovers an anode, a cathode, or the like of the electrolysis cell 2X, similarly to the carbon dioxide electrolytic device 1 according to the first embodiment.

The carbon dioxide electrolytic device 1X illustrated in FIG. 12 includes basically the same configuration as that of the electrolytic device 1 illustrated in FIG. 1 except that a configuration of the electrolysis cell 2X is different. The electrolysis cell 2X includes a reaction tank 53 having an anode solution tank 51, a cathode solution tank 52, and a separator 30 which separates these anode solution tank 51 and cathode solution tank 52 as illustrated in FIG. 13. The anode solution tank 51 has a solution inlet port 54A and a solution discharge port 55A connected to the anode solution supply system 100, and a gas inlet port 56A and a gas discharge port 57A. An anode solution is introduced from and discharged to the anode solution supply system 100 to/from the anode solution tank 51. An anode 11 is disposed in the anode solution tank 51 so as to be immersed in the anode solution. The anode 11 is connected via a current introduction portion 58A to a power supply 40.

The cathode solution tank 52 has a solution inlet port 54B and a solution discharge port 55B connected to the cathode solution supply system 200, and a gas inlet port 56B and a gas discharge port 57B connected to the gas supply system 300. A cathode solution is introduced from and discharged to the cathode solution supply system 200 to/from the cathode solution tank 52. Moreover, $CO_2$ gas is introduced from the gas supply system 300 to the cathode solution tank 52, and gas containing a gaseous product is sent to the product collection system 400. In order to increase solubility of the $CO_2$ gas in the cathode solution, the $CO_2$ gas is preferably released from the gas inlet port 56B into the cathode solution. A cathode 22 is disposed in the cathode solution tank 52 so as to be immersed in the cathode solution. The cathode 22 is connected via a current introduction portion 58B to the power supply 40.

A gaseous substance supply system 710 of the refresh material supply unit 700 is connected via pipes to the gas inlet port 56A of the anode solution tank 51 and the gas inlet port 56B of the cathode solution tank 52. A rinse solution supply system 720 of the refresh material supply unit 700 is connected via pipes to the solution inlet port 54A of the anode solution tank 51 and the solution inlet port 54B of the cathode solution tank 52. The solution discharge port 55A of the anode solution tank 51 and the solution discharge port 55B of the cathode solution tank 52 are connected via pipes to the waste solution collection system 600. The gas discharge port 57A of the anode solution tank 51 and the gas discharge port 57B of the cathode solution tank 52 are connected via pipes to the waste solution collection system 600, and recovery via the waste solution collection system 600 into an unillustrated waste gas collection tank or release to atmosphere is performed. Composing materials or the like of the respective parts are the same as those of the electrolytic device 1 of the first embodiment, and details are as described above.

In the electrolytic device 1X of the second embodiment, a start-up step S101 and a $CO_2$ electrolysis operation step S102 of the electrolytic device 1X are performed similarly to those in the electrolytic device 1 of the first embodiment except that supply modes of the anode solution, the cathode solution, and the $CO_2$ gas are different. A determination step S103 whether to satisfy the request criteria of the cell output or not is also performed similarly to that in the electrolytic device 1 of the first embodiment. That is, when at least one of a cell voltage, a cell current, and Faradaic efficiency of a carbon compound does not satisfy the request criteria, a cell output is determined as not satisfying the request criteria, and a refresh operation step S105 is performed. In the electrolytic device 1X of the second embodiment, the refresh operation step S105 is performed as follows.

First, a $CO_2$ reduction reaction is stopped by stopping an output of a power supply 40. Next, the anode solution and the cathode solution are discharged from the anode solution tank 51 and the cathode solution tank 52. Next, a rinse solution is supplied from the rinse solution supply system 720 to the anode solution tank 51 and the cathode solution tank 52, and the anode 11 and the cathode 22 are washed. Next, gas is supplied from the gaseous substance supply system 710 to the anode solution tank 51 and the cathode solution tank 52, and the anode 11 and the cathode 22 are dried. The gas and rinse solution to be used for the refresh operation step S105 are the same as those in the first embodiment. When the above refresh operation finishes, the anode solution is introduced to the anode solution tank 51, the cathode solution is introduced to the cathode solution tank 52, and further $CO_2$ gas is supplied in the cathode solution. Then, by starting the output of the power supply 40 (S206), the $CO_2$ electrolysis operation is resumed. For the discharge of the cathode solution and the anode solution from each of the solution tanks 51 and 52, gas may be used or the rinse solution may be used. However, amounts of the cathode solution and the anode solution are larger compared with those in the first embodiment. In order to shorten a time for the refresh operation, the rinse solution is preferably supplied after discharging the solutions using the gas.

In the electrolytic device 1X of the second embodiment, the refresh operation may be performed as follows. The current introduction portions 58 (58A, 58B) provided in an upper portion of the electrolysis cell 2X are detached, and the anode 11 and the cathode 22 are taken outside to be exposed from the anode solution and the cathode solution. Next, the anode 11 and the cathode 22 are immersed in the rinse solution to be washed. Next, the anode 11 and the cathode 22 are taken out from the rinse solution and dried by spraying the gas. Next, the current introduction portions 58 (58A, 58B) are attached, and the anode 11 and the cathode 22 are immersed in the anode solution and the cathode solution. Then, the $CO_2$ electrolysis operation is resumed by starting a power output. Thereby, the discharge and the introduction of the anode solution and the cathode solution from the anode solution tank 51 and the cathode solution tank 52 are omitted, and therefore it is possible to shorten a time for the refresh operation.

Also in the electrolytic device 1X of the second embodiment, based on whether the cell output of the electrolysis cell 2X satisfies the request criteria or not, a determination is made whether the $CO_2$ electrolysis operation is continued or whether the refresh operation is performed. By supplying the rinse solution and the gas in the refresh operation step, deviation of distribution of ions and residual gas in the vicinities of the anode 11 and the cathode 22, which becomes a decrease factor of the cell output, is eliminated, and precipitation of an electrolyte in the anode 11 and the cathode 22, and the like are removed. Accordingly, by resuming the $CO_2$ electrolysis operation after the refresh operation step, the cell output of the electrolysis cell 2X can be recovered. Repeating the $CO_2$ electrolysis operation and the refresh operation based on the request criteria of the cell output makes it possible to maintain $CO_2$ electrolysis performance by the electrolytic device 1X for a long stretch of time.

Third Embodiment

Figure 14:
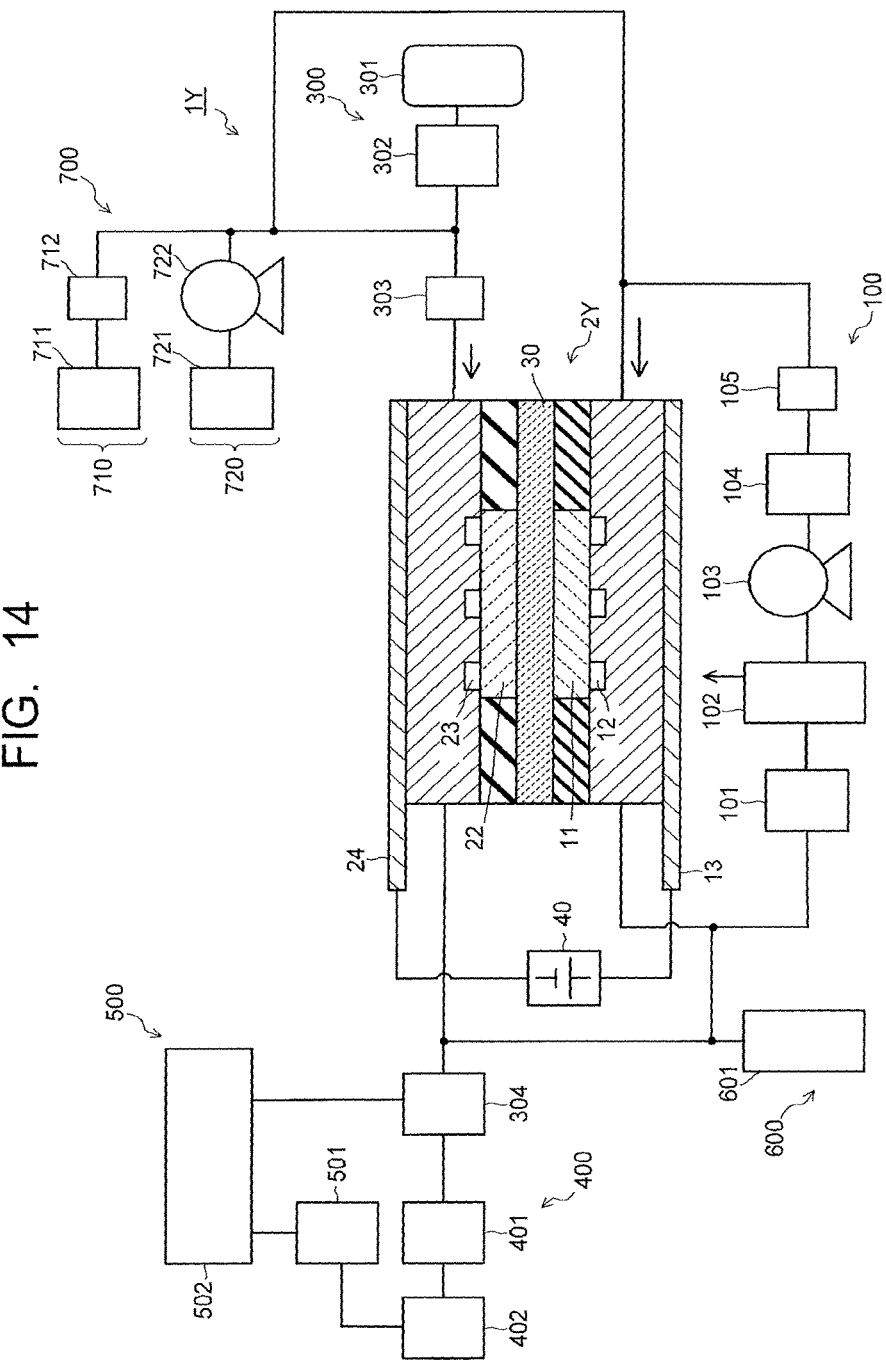
FIG. 14 is a view illustrating a carbon dioxide electrolytic device of a third embodiment.
Figure 15:
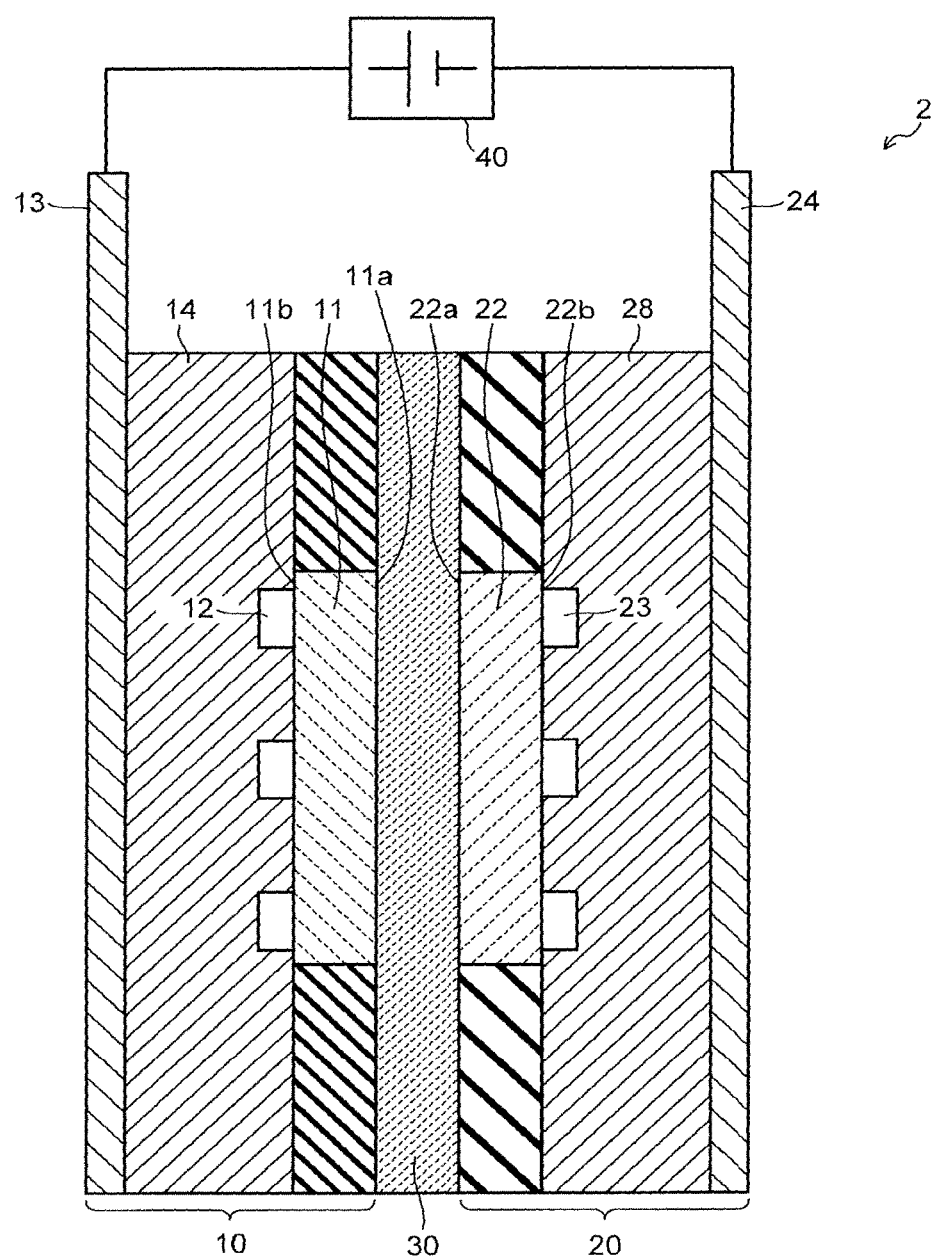
FIG. 15 is a sectional view illustrating an electrolysis cell of the carbon dioxide electrolytic device illustrated in FIG. 14.

FIG. 14 is a view illustrating a configuration of a carbon dioxide electrolytic device according to a third embodiment,
and FIG. 15 is a sectional view illustrating a configuration of an electrolysis cell in the electrolytic device illustrated in FIG. 14. A carbon dioxide electrolytic device 1Y illustrated in FIG. 14 includes: an electrolysis cell 2Y; an anode solution supply system 100 which supplies an anode solution to the electrolysis cell 2Y; a gas supply system 300 which supplies carbon dioxide ($CO_2$) gas to the electrolysis cell 2Y; a product collection system 400 which collects a product produced by a reduction reaction in the electrolysis cell 2Y; a control system 500 which detects a type and a production amount of the collected product and, performs control of the product and control of a refresh operation; a waste solution collection system 600 which collects a waste solution of the anode solution; and a refresh material supply unit 700 which recovers an anode, a cathode, or the like of the electrolysis cell 2Y, similarly to the carbon dioxide electrolytic device 1 according to the first embodiment.

The carbon dioxide electrolytic device 1Y illustrated in FIG. 14 includes basically the same configuration as that of the electrolytic device 1 illustrated in FIG. 1 except that the configuration of the electrolysis cell 2X is different and a cathode solution supply system 200 is not included. The electrolysis cell 2Y includes an anode part 10, a cathode part 20, and a separator 30 as illustrated in FIG. 15. The anode part 10 includes an anode 11, an anode solution flow path 12, and an anode current collector 13. The cathode part 20 includes a cathode 22, a $CO_2$ gas flow path 23, and a cathode current collector 24. A power supply 40 is connected via a current introduction member to the anode 11 and the cathode 22.

The anode 11 preferably has a first surface 11a in contact with the separator 30 and a second surface 11b facing the anode solution flow path 12. The first surface 11a of the anode 11 is in close contact with the separator 30. An anode solution flow path 12 is constituted by a pit (groove portion/concave portion) provided in a flow path plate 14. An anode solution flows through in the anode solution flow path 12 so as to be in contact with the anode 11. The anode current collector 13 is electrically in contact with a surface on a side opposite to the anode 11 of the flow path plate 14 constituting the anode solution flow path 12. The cathode 22 has a first surface 22a in contact with the separator 30 and a second surface 22b facing the $CO_2$ gas flow path 23. The $CO_2$ gas flow path 23 is constituted by a pit (groove portion/concave portion) provided in a flow path plate 28. The cathode current collector 24 is electrically in contact with a surface on a side opposite to the cathode 22 of the flow path plate 28 constituting the $CO_2$ gas flow path 23.

A gaseous substance supply system 710 and a rinse solution supply system 720 of the refresh material supply unit 700 are connected via pipes to the anode solution flow path 12 and the $CO_2$ gas flow path 23. The anode solution flow path 12 and the $CO_2$ gas flow path 23 are connected via pipes to the waste solution collection system 600. A rinse solution discharged from the anode solution flow path 12 and the $CO_2$ gas flow path 23 is recovered into a waste solution collection tank 601 of the waste solution collection system 600. Gas for refresh discharged from the anode solution flow path 12 and the $CO_2$ gas flow path 23 is recovered via the waste solution collection system 600 into an unillustrated waste gas collection tank or released to atmosphere. Composing materials or the like of the respective parts are the same as those of the electrolytic device 1 of the first embodiment, and details are as described above.

In the electrolytic device 1Y of the third embodiment, a start-up step S101 and a $CO_2$ electrolysis operation step S102 of the electrolytic device 1Y are performed similarly to those in the electrolytic device 1 of the first embodiment except that supply of a cathode solution is not performed. Note that a reduction reaction of $CO_2$ in the cathode part 20 is performed by $CO_2$ supplied from the $CO_2$ gas flow path 23 and the anode solution which permeates the cathode 22 via the separator 30. A determination step S103 whether to satisfy the request criteria of the cell output or not is also performed similarly to that in the electrolytic device 1 of the first embodiment. That is, when at least one of a cell voltage, a cell current, and Faradaic efficiency of a carbon compound does not satisfy the request criteria, a cell output is determined as not satisfying the request criteria, and a refresh operation step S105 is performed. In the electrolytic device 1Y of the third embodiment, the refresh operation step S105 is performed as follows.

First, the $CO_2$ reduction reaction is stopped by stopping an output of a power supply 40. Next, the anode solution is discharged from the anode solution flow path 12. Next, the rinse solution is supplied from the rinse solution supply system 720 to the anode solution flow path 12 and the $CO_2$ gas flow path 23, and the anode 11 and the cathode 22 are washed. Next, the anode 11 and the cathode 22 are dried by supplying gas from the gaseous substance supply system 710 to the anode solution flow path 12 and the $CO_2$ gas flow path 23. The gas and rinse solution to be used for the refresh operation step are the same as those in the first embodiment. When the above refresh operation finishes, the anode solution is introduced to the anode solution flow path 12, and $CO_2$ gas is introduced to the $CO_2$ gas flow path 23. Then, by starting the output of the power supply 40, the $CO_2$ electrolysis operation is resumed.

Also in the electrolytic device 1Y of the third embodiment, based on whether the cell output of the electrolysis cell 2Y satisfies the request criteria or not, a determination is made whether the $CO_2$ electrolysis operation is continued or whether the refresh operation is performed. By supplying the rinse solution and the gas in the refresh operation step, deviation of distribution of ions in the vicinities of the anode 11 and the cathode 22, which becomes a decrease factor of the cell output, is eliminated, and further a water excess in the cathode 22, precipitation of an electrolyte in the anode 11 and the cathode 22, flow path clogging due thereto, and the like are removed. Accordingly, by resuming the $CO_2$ electrolysis operation after the refresh operation step, the cell output of the electrolysis cell 2Y can be recovered. Repeating the above $CO_2$ electrolysis operation and refresh operation based on the request criteria of the cell output makes it possible to maintain $CO_2$ electrolysis performance by the electrolytic device 1Y for a long stretch of time.

EXAMPLE

Next, an example and its evaluation result will be described.

Example 1

An electrolytic device illustrated in FIG. 1 and FIG. 2 was fabricated as follows, and electrolysis performance of carbon dioxide was examined. First, on carbon paper on which a porous layer was provided, a cathode to which gold nanoparticle-supported carbon particles were applied was produced by the following process. A coating solution in which the gold nanoparticle-supported carbon particles and pure water, a Nafion solution, and ethylene glycol were mixed was produced. An average particle diameter of the gold nanoparticle was 8.7 nm, and a supported amount thereof was 18.9 mass %. An air brush was filled with this coating solution, spray coating was performed using Ar gas on the carbon paper on which the porous layer was provided. Flowing water washing was performed by pure water for 30 minutes after the coating, and thereafter organic matter such as ethylene glycol was removed by oxidation through immersing in a hydrogen peroxide solution, This was cut into a size of 2×2 cm to be set as the cathode. Note that a coating amount of Au was estimated at about 0.2 mg/cm$^2$ from a mixing amount of the gold nanoparticles and the carbon particles in the coating solution.

For an anode, an electrode in which $IrO_2$ nanoparticles which became a catalyst were applied to Ti mesh was used. As the anode, the one in which $IrO_2$/Ti mesh was cut into 2×2 cm was used.

The electrolysis cell 2 was produced by being stacked in order of the cathode current collector 24, the $CO_2$ gas flow path 23 (the third flow path plate 28), the cathode 22, the cathode solution flow path 21 (the second flow path plate 25), the separator 30, the anode 11, the anode solution flow path 12 (the first flow path plate 14), and the anode current collector 13 from the top, being sandwiched by the support plates not illustrated, and further being tightened by the bolts, as illustrated in FIG. 2. For the separator 30, an anion exchange membrane (brand name: Selemion, manufactured by ASAHI GLASS CO., LTD.) was used. The $IrO_2$/Ti mesh of the anode 11 was brought in close contact with the anion exchange membrane. A thickness of the cathode solution flow path 21 was set to 1 mm. Note that an evaluation temperature was set to room temperature.

The electrolytic device 1 illustrated in FIG. 1 was fabricated using the above-described electrolysis cell 2, and the electrolytic device was operated under the following condition. $CO_2$ gas was supplied to the $CO_2$ gas flow path of the electrolysis cell at 20 sccm, an aqueous potassium hydroxide solution (concentration 1 M KOH) was introduced to the cathode solution flow path at a flow rate of 5 mL/min, and the aqueous potassium hydroxide solution (concentration 1 M KOH) was introduced to the anode solution flow path at a flow rate of 20 mL/min. Next, a 600 mA constant current (constant current density 150 mA/cm$^2$) was passed between the anode and the cathode using the power supply, an electrolytic reaction of $CO_2$ was performed, and a cell voltage at that time were measured to be collected by the data collection control unit. Moreover, part of gas outputted from the $CO_2$ gas flow path was collected, and production amounts of CO gas produced by a reduction reaction of $CO_2$ and $H_2$ gas produced by a reduction reaction of water were analyzed by a gas chromatograph. A partial current density and Faradaic efficiency which was a ratio between the entire current density and the partial current density of CO or $H_2$ from the gas production amounts in the data collection control unit were calculated to be collected. As request criteria of a cell output of a refresh operation, CO Faradaic efficiency was set to 50% or less, and a cell voltage at a time of passing a constant current was set to 3 V or more corresponding to 120% or more relative to an initial value 2.5 V.

Table 1 presents a cell voltage, CO Faradaic efficiency and $H_2$ Faradaic efficiency which are collected every about 20 minutes. Because a value of 50% or less such as 24% was detected in the CO Faradaic efficiency after 55 minutes, the refresh operation was performed. Pure water was made to flow through the cathode solution flow path and the anode solution flow path of the electrolysis cell, and the cathode, the cathode solution flow path, the anode, and the anode solution flow path were washed. Next, air gas was made to flow through the cathode solution flow path and the anode solution flow path, which were dried. After the above refresh operation finished, the $CO_2$ electrolytic reaction was resumed by making a 1 M KOH aqueous solution flow through the cathode solution flow path and the anode solution flow path. Table 2 presents a cell output after the refresh operation. As presented in Table 2, the CO Faradaic efficiency became 84%, and it was confirmed that the cell output was recovered by the refresh operation.

TABLE 1

| TIME [MINUTE] | 9.5 | 33 | 55 |
|---|---|---|---|
| CO FARADAIC EFFICIENCY [%] | 83.8 | 52.1 | 24.1 |
| $H_2$ FARADAIC EFFICIENCY [%] | 7.2 | 19.5 | 23.6 |
| CELL VOLTAGE [V] | 2.53 | 2.75 | 2.95 |

TABLE 2

| | AFTER REFRESH OPERATION |
|---|---|
| CO FARADAIC EFFICIENCY [%] | 83.9 |
| $H_2$ FARADAIC EFFICIENCY [%] | 12.5 |
| CELL VOLTAGE [V] | 2.72 |

Note that configurations of the above-described embodiments may be each applied in combination, and further may be partially substituted. Herein, while certain embodiments of the invention have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the invention.

What is claimed is:

1. A carbon dioxide electrolytic device comprising:
an electrolysis cell including a cathode to reduce carbon dioxide and thus produce a carbon compound, an anode to oxidize water or hydroxide ions and thus produce oxygen, a carbon dioxide supply unit to supply carbon dioxide to the cathode, a electrolytic solution supply unit to supply an electrolytic solution containing water to at least one of the cathode and the anode, and a separator to separate the anode and the cathode;
a power supply connected to the anode and the cathode;
a reaction control unit to cause a reduction reaction of the carbon dioxide in the cathode and an oxidation reaction of the water or hydroxide ions in the anode by passing an electric current from the power supply to the anode and the cathode;
a refresh material supply unit including a gas supply unit to supply a gaseous substance as at least part of the refresh material to at least one of the anode and the cathode; and
a refresh control unit which stops supply of the electric current from the power supply by the reaction control unit and stops supply of the carbon dioxide and the electrolytic solution, and operates the refresh material supply unit, based on request criteria of a cell output which is at least one of output values of the electrolysis cell.

2. The device according to claim 1, wherein the refresh material supply unit further includes a liquid supply unit to supply a rinse solution as a part of the refresh material to at least one of the anode and the cathode.

3. The device according to claim 2, wherein the liquid supply unit includes a first liquid supply unit to supply an acid rinse solution to at least one of the anode and the cathode, and a second liquid supply unit to supply water to at least one of the anode and the cathode.

4. The device according to claim 2, wherein the refresh control unit controls an operation of the refresh material supply unit so as to supply the rinse solution from the liquid supply unit and thereafter supply the gaseous substance from the gas supply unit, to at least one of the cathode and the anode exposed from the electrolytic solution.

5. The device according to claim 1, wherein the refresh control unit operates the refresh material supply unit when the cell output of at least one of a cell voltage, a cell current, and Faradaic efficiency of the carbon compound does not satisfy request criteria.

6. The device according to claim 1, wherein the gaseous substance contains at least one selected from the group consisting of air, carbon dioxide, oxygen, nitrogen, and argon.

7. The device according to claim 1,
wherein the carbon dioxide supply unit has a gas flow path through which the carbon dioxide is made to flow so as to be in contact with the cathode, and
wherein the electrolytic solution supply unit has a cathode solution flow path through which a cathode solution as the electrolytic solution is made to flow so as to be in contact with the cathode, and an anode solution flow path through which an anode solution as the electrolytic solution is made to flow so as to be in contact with the anode.

8. The device according to claim 7,
wherein the anode has a first surface in contact with the separator, and a second surface facing the anode solution flow path so that the anode solution is in contact with the anode, and
wherein the cathode has a first surface facing the cathode solution flow path and a second surface facing the gas flow path, and the cathode solution flow path is disposed between the separator and the cathode so that the cathode solution is in contact with the separator and the cathode.

9. The device according to claim 1,
wherein the electrolytic solution supply unit has a cathode solution tank to accommodate a cathode solution as the electrolytic solution in which the cathode is immersed and an anode solution tank to accommodate an anode solution as the electrolytic solution in which the anode is immersed, and
wherein the carbon dioxide supply unit has a carbon dioxide supply system to supply the carbon dioxide to the cathode solution.

10. The device according to claim 1,
wherein the carbon dioxide supply unit has a gas flow path through which the carbon dioxide is made to flow so as to be in contact with the cathode,
wherein the electrolytic solution supply unit has an anode solution flow path through which an anode solution as the electrolytic solution is made to flow so as to be in contact with the anode, and
wherein the cathode and the anode are in contact with the separator.

11. A carbon dioxide electrolytic method comprising:
preparing an electrolysis cell having an anode and a cathode;
supplying carbon dioxide to the cathode in the electrolysis cell, and supplying an electrolytic solution containing water to at least one of the cathode and the anode in the electrolysis cell;
supplying an electric current from a power supply to the anode and the cathode, reducing carbon dioxide to produce a carbon compound in a vicinity of the cathode, and oxidizing water or hydroxide ions to produce oxygen in a vicinity of the anode;
stopping supply of the electric current from the power supply and stopping supply of the carbon dioxide and the electrolytic solution; and
supplying a gaseous substance as at least part of a refresh material to at least one of the anode and the cathode exposed from the electrolytic solution, based on request criteria of a cell output which is at least one of output values of the electrolysis cell.

12. The method according to claim 11, wherein a rinse solution is supplied to at least one of the cathode and the anode exposed from the electrolytic solution as a part of the refresh material, in advance of supply of the gaseous substance.

13. The method according to claim 12, wherein the rinse solution and the gaseous substance are supplied to at least one of the cathode and the anode when the cell output of at least one of a cell voltage, a cell current, and Faradaic efficiency of the carbon compound does not satisfy request criteria.

* * * * *